(12) United States Patent
Tsurukawa et al.

(10) Patent No.: US 7,307,368 B2
(45) Date of Patent: Dec. 11, 2007

(54) DC MOTOR

(75) Inventors: Ikuya Tsurukawa, Yokohama (JP);
Yoshimi Ohno, Kawasaki (JP); Kenji Koyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/877,217

(22) Filed: Jun. 11, 2001

(65) Prior Publication Data

US 2002/0027395 A1    Mar. 7, 2002

(30) Foreign Application Priority Data

| Jun. 9, 2000 | (JP) | ............................ 2000-174570 |
| Jun. 9, 2000 | (JP) | ............................ 2000-174571 |
| Dec. 29, 2000 | (JP) | ............................ 2000-404949 |

(51) Int. Cl.
*H02K 13/00* (2006.01)
*H01R 39/04* (2006.01)

(52) U.S. Cl. .................... 310/237; 310/231; 310/68 B (58) Field of Classification Search ................ 310/233, 310/234, 128, 248, 237, 231
See application file for complete search history.

(56) References Cited

U.S. PATENT DOCUMENTS

| 3,777,367 | A | * | 12/1973 | Kalagidis ..................... 29/597 |
| 4,037,125 | A | * | 7/1977 | Aoki ........................... 310/248 |
| 4,088,914 | A | * | 5/1978 | Aoki ........................... 310/264 |
| 4,228,376 | A | * | 10/1980 | Mabuchi ...................... 310/242 |
| 4,514,670 | A | * | 4/1985 | Fassel et al. ................ 318/266 |
| 5,119,466 | A | * | 6/1992 | Suzuki ...................... 310/68 R |
| 5,528,096 | A | * | 6/1996 | Orii et al. ................... 310/237 |
| 5,598,045 | A | * | 1/1997 | Ohtake et al. ........ 310/40 MM |
| 6,259,183 | B1 | * | 7/2001 | Hotta et al. ................. 310/233 |
| 6,359,364 | B1 | * | 3/2002 | Yamaguchi et al. ........ 310/248 |
| 6,617,816 | B2 | | 9/2003 | Ohno et al. |
| 6,628,893 | B2 | | 9/2003 | Ohno et al. |

(Continued)

FOREIGN PATENT DOCUMENTS

CN    87 2 15879    9/1988

(Continued)

OTHER PUBLICATIONS

Translation of jp 55-133651, Ito, "commutating device for small dc motor", Oct. 17, 1980.*

(Continued)

*Primary Examiner*—Karl Tamai
(74) *Attorney, Agent, or Firm*—Oblon, Spivak, McClelland, Maier & Neustadt, P.C.

(57) ABSTRACT

A direct current motor including a rotor having a rotation shaft and rotor coils, a stator configured to apply a magnetic field to the rotor via magnetic poles of the stator opposing magnetic poles of the rotor, an electrical parts mounting base board fixed on the rotation shaft such that the rotation shaft perpendicularly intersects the electrical parts mounting base board, and a commutator having a contact electrode part formed with a plane conductive layer pattern and connected to the rotor coils. The contact electrode part is formed on the electrical parts mounting base board. The direct current motor further includes a pair of electrode brushes in sliding contact with the contact electrode part of the commutator and configured to supply electric power to the rotor coils though the commutator.

10 Claims, 9 Drawing Sheets

U.S. PATENT DOCUMENTS

| | | | |
|---|---|---|---|
| 6,803,685 B2 * | 10/2004 | Ikawa et al. | 310/68 B |
| 6,876,121 B2 * | 4/2005 | Kobayashi et al. | 310/252 |
| 2002/0027395 A1 * | 3/2002 | Tsurukawa et al. | 310/237 |
| 2002/0044769 A1 * | 4/2002 | Ohno et al. | 388/800 |
| 2002/0163259 A1 * | 11/2002 | Ohno et al. | 310/68 C |

FOREIGN PATENT DOCUMENTS

| | | | |
|---|---|---|---|
| CN | 1086641 | | 5/1994 |
| JP | 51-49802 | | 4/1976 |
| JP | 52-49804 | | 4/1977 |
| JP | 52-92201 | | 7/1977 |
| JP | 53-28208 | | 3/1978 |
| JP | 54-27304 | | 2/1979 |
| JP | 54097712 | * | 8/1979 |
| JP | 55-18890 | | 2/1980 |
| JP | 55-125054 | | 9/1980 |
| JP | 55133651 A | * | 10/1980 |
| JP | 56-88651 | | 7/1981 |
| JP | 56088650 A | * | 7/1981 |
| JP | 56-110462 | | 9/1981 |
| JP | 61-258660 | | 11/1986 |
| JP | 62-88459 | | 6/1987 |
| JP | 1-282574 | | 11/1989 |
| JP | 4-127864 | | 4/1992 |
| JP | 4-88365 | | 7/1992 |
| JP | 2545302 | | 4/1993 |
| JP | 05344688 | * | 12/1993 |
| JP | 05344688 A | * | 12/1993 |
| JP | 6-153456 | | 5/1994 |
| JP | 06189504 A | * | 7/1994 |
| JP | 08-331812 | * | 12/1996 |
| JP | 11-266569 | | 9/1999 |

OTHER PUBLICATIONS

Translation of jp 56-88650, Oyama, "structure of commutator of small scale commutator motor", Jul. 18, 1981.*
Translation of Ito, JP 55-133651, "commutating device for small dc motor" Oct. 1980.*
Translation of Oyama, JP 56-088650, "structure of commutator of small scale commutator motort", Jul. 1981.*
Translation of Yamaguchi, JP 08331812, "small size dc motor equipped with a flat commutator", Dec. 1996.*
U.S. Appl. No. 09/737,767, filed Dec. 18, 2000, Abandoned.
U.S. Appl. No. 09/884,103, filed Jun. 20, 2001, pending.

* cited by examiner

DC MOTOR

CROSS-REFERENCE TO RELATED APPLICATIONS

This document claims priority and contains subject matter related to Japanese Patent Application No. 2000-174571 filed in the Japanese Patent Office on Jun. 9, 2000, Japanese Patent Application No. 2000-174570 filed in the Japanese Patent Office on Jun. 9, 2000, and Japanese Patent Application No. 2000-404949 filed in the Japanese Patent Office on Dec. 29, 2000, the entire contents of which are hereby incorporated by reference.

BACKGROUND OF THE INVENTION

1. Field of the Invention

The present invention relates lo a brush-use DC (direct current) motor, and more particularly relates to a compact DC motor for use in a camera, etc.

2. Discussion of the Background

In a bush-use DC motor, a rotor in which rotor coils are wound is fixed on a rotation shaft. A stator applies magnetic field to the rotor via magnetic poles of the stator opposing magnetic poles of the rotor. Further, a DC drive current is switched corresponding to a rotation angle of the rotor and is applied to the rotor coils through a commutator, which rotates together with the rotor and through an electrode brush in sliding contact with the commutator.

The commutator includes contact electrode parts integrally provided with the rotation shaft. The contact electrode parts include plural segments and are connected to the rotor coils.

In addition, a DC drive current is fed from a DC power supply to the electrode brush in sliding contact with the contact electrode parts of the commutator, and is then applied to the rotor coils while the flow direction of the DC drive current is switched by the commutator. Specifically, the flow direction of the DC drive current applied to the electrode brush is switched when the electrode brush switches from one segment to another segment of the contact electrode parts due to the rotation of the commutator.

Generally, the commutator employed in the DC motor of this type includes a circular cylinder-shape, and the cylindrical surface of the commutator is divided into plural contact electrode parts which surround the circumference of the rotation shaft at equally angled intervals with a small gap separating each part. In addition, respective contact electrode parts connect to the rotor coils. A pair of electrode brushes connected to the DC drive power supply is brought into sliding contact with the contact electrode parts of the commutator on rotation angle position of, for example, 180° relative to the commutator.

This type of the background brush-use DC motor is generally constructed such that a pair of electrode brushes is in sliding contact with the above-described contact electrode parts formed on the cylindrical surface of the commutator while pressing toward the axial line of the rotation shaft (i.e., in substantially the radial direction).

Figure 17:
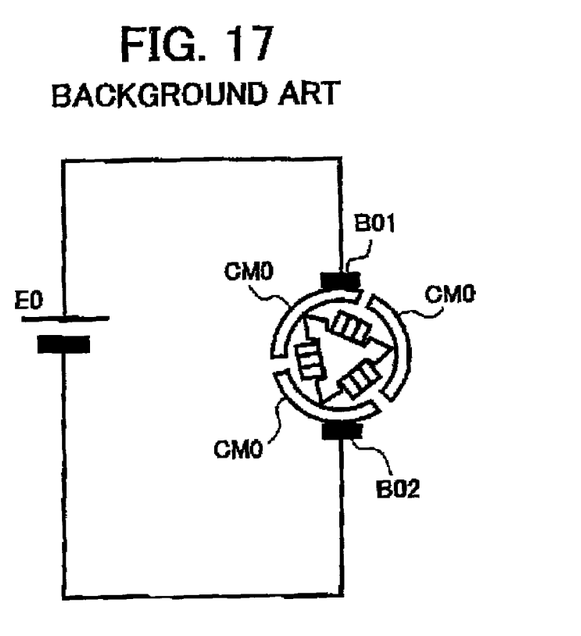
FIG. 17 is a schematic circuit diagram employing a three-pole DC motor according to a background art.

For example, FIG. 17 illustrates a three-pole brush-use DC motor. In the three-pole motor, electricity is fed to a commutator CM0 which is in sliding contact with a pair of electrode brushes B01 and B02 from a DC drive power supply E0 through the paired electrode brushes B01 and B02. The paired electrode brushes B01 and B02 are brought into contact with the commutator CM0 an rotation angle positions different by 180°. The commutator CM0 includes three pieces which form a cylindrical surface and rotates together with a rotor of the DC motor. The three pieces of the commutator CM0 are separated at equally angled intervals of about 120°.

Further, three rotor coils are connected to each other between the adjacent pieces of the commutator CM0, and thereby three rotor magnetic poles are formed therebetween. The polarity of these rotor magnetic poles varies depending on the contact state of each piece of the commutator CM0 and the electrode brushes B01 and B02 which changes corresponding to the rotation angle of the rotor. Thereby, a rotation driving force is generated between, for example, a pair of stator magnetic poles of a permanent magnet at the side of a stator (not shown).

With the rotation of the rotor, respective rotor magnetic poles oppose respective stator magnetic poles in order, and the contact state of each piece of the commutator CM0 and the electrode brushes B01 and B02 changes. Thus, by varying the polarity of each rotor magnetic pole in order, the rotor continually rotates.

Specifically, when a voltage is applied to the paired electrode brushes B01 and B02 from the power supply E0, the current flows from one of the electrode brushes B01 and B02 to the other through the rotor coils. The magnetic field is generated by the rotor coils, and thereby the rotor magnetic poles are formed. By the action of the magnetic field generated by the rotor coils and the magnetic field generated by the stator magnetic poles, the rotor rotates.

As a method of detecting the rotation of the above-described motor, a rotary encoder method is known. Specifically, in the rotary encoder method, a rotation slit disk having slits on the circumferential surface thereof is provided on a rotation output shaft of the motor or in a power transmission mechanism rotated by the rotation output shaft. The rotation of the motor is detected by detecting the slits on the circumferential surface of the rotation slit disk with a photointerrupter. Although the rotary encoder method allows an accurate detection of the rotation of the motor, the space and cost for the rotary encoder constructed by the rotation slit disk and the photointerrupter are inevitably increased.

Further, in the above-described brush-use DC motor in which the electrode brushes are brought into sliding contact with the cylindrical surface of the commutator while pressing toward the axial line of the rotation shaft, assembling the commutator and the electrode brushes is typically difficult in the DC motor.

Specifically, in this type of DC motor, because the electrode brushes are configured to press the cylindrical surface of the commutator, the brush-to-brush spatial distance is narrower than the diameter of the commutator. For this reason, in assembling the motor, the commutator needs to be inserted in the narrow space between the electrode brushes. This may cause the deformation of the electrode brushes due to contact with the commutator during assembly.

Further, to avoid the positional deviation of the electrode brush in the axial direction of the rotation shaft and to avoid the electrode brush falling from the circumference surface of the commutator when the DC motor rotates, flanges of a relatively large diameter may be formed at both ends of the cylinder-shaped commutator. These flanges also make assembling the DC motor difficult.

Moreover, in the above-described DC motor, because the commutator has a cylinder shape, the commutator occupies a larger space expanding in the thrust direction along the axis of the rotation shaft of the DC motor.

SUMMARY OF THE INVENTION

According to one aspect of the present invention, a direct current motor includes a rotor having a rotation shaft and rotor coils, a stator configured to apply a magnetic field to the rotor via magnetic poles of the stator opposing magnetic poles of the rotor, an electrical parts mounting base board fixed on the rotation shaft such that the rotation shaft perpendicularly intersects the electrical parts mounting base board, and a commutator having a contact electrode part formed with a plane conductive layer pattern and connected to the rotor coils. The contact electrode part is formed on the electrical pars mounting base board. The direct current motor further includes a pair of electrode brushes in sliding contact with the contact electrode part of the commutator and configured to supply electric power to the rotor coils though the commutator.

According to another aspect of the present invention, the direct current motor also includes at least one rotation detecting brush in sliding contact with the contact electrode part of the commutator and configured to detect a signal on the commutator indicative of an operation of the direct current motor.

The present invention also includes a method of making a direct current motor. The method includes forming the contact electrode part of the commutator with a plane conductive layer pattern on the electrical parts mounting base board, fixing the electrical parts mounting base board on the rotation shaft such that the rotation shaft perpendicularly intersects the electrical parts mounting base board, providing the pair of electrode brushes on a support base, and assembling the support base onto the electrical parts mounting base board and the rotation shaft such that the electrode brushes are in sliding contact with the contact electrode part of the commutator in the same plane.

Further, in the example in which the direct current motor includes at least one rotation detecting brush, the providing step provides the pair of electrode brushes and the at least one rotation detecting brush on a support base, and the assembling step assembles the support base onto the electrical parts mounting base board and the rotation shaft such that the electrode brushes and the at least one rotation detecting brush are in sliding contact with the contact electrode part of the commutator in the same plane.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will now be described in detail referring to the drawings, wherein like reference numerals designate identical or corresponding parts throughout the several views.

Figure 1:
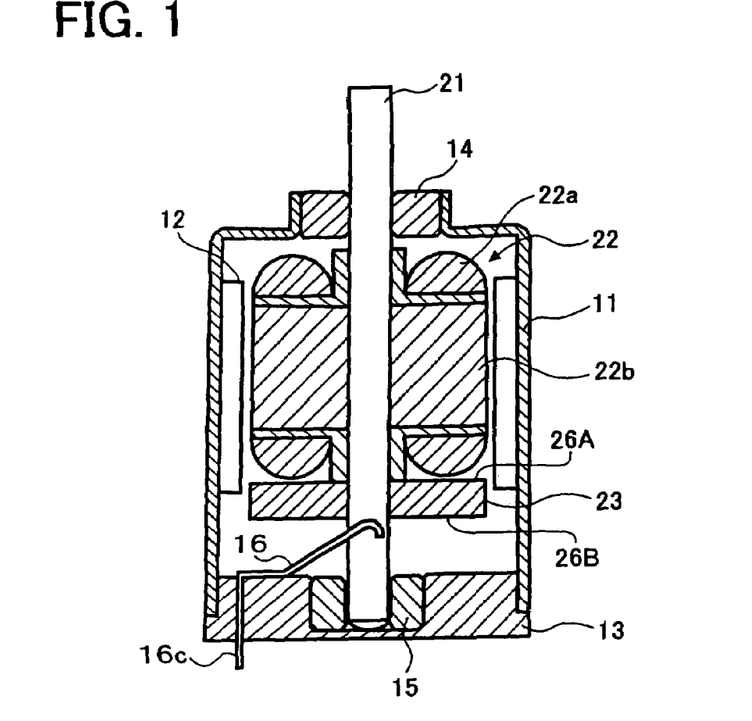
FIG. 1 is a vertical longitudinal section view of a DC motor according to a first embodiment of the present invention.
Figure 2:
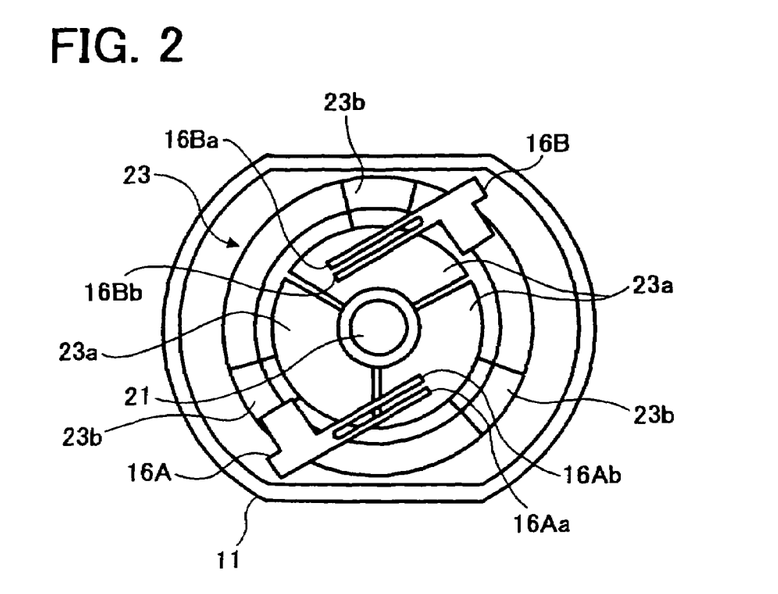
FIG. 2 is a transverse cross-sectional view of the DC motor of FIG. 1 and illustrates constructions of a commutator and electrode brushes.

FIGS. 1 and 2 illustrate a construction of a DC motor according to a first embodiment of the present invention. In more detail, FIG. 1 is a vertical longitudinal sectional view of the DC motor, and FIG. 2 is a transverse cross-sectional view of the DC motor of FIG. 1 and illustrates constructions of a commutator and electrode brushes.

The DC motor illustrated in FIGS. 1 and 2 includes a case 11, a stator 12, a support base 13, an upper bearing 14, a lower bearing 15, a pair of electrode brushes 16, a rotation shaft 21, a rotor 22, and a printed circuit board 23.

The case 11, the stator 12, the support base 13, the upper hearing 14, the lower bearing 15, and the electrode brushes 16 are the elements belonging to a stator section side and do not rotate. The rotation shaft 21, the rotor 22, and the printed circuit board 23 are the elements belonging to a rotor section side and rotate. The rotor 22 and the printed circuit board 23 are integrally provided with the rotation shaft 21.

The pair of electrode brushes 16 includes a first electrode brush 16A and a second electrode brush 16B (the first electrode brush 16A and the second electrode brush 16B may be collectively referred to the electrode brushes 16).

The first electrode brush 16A and the second electrode brush 16B are formed in a rotationally symmetrical state relative to the rotation shaft 21.

As illustrated in FIG. 2, part of the first electrode brush 16A is split into two separate portions 16Aa and 16Ab. A slit having a width wider than each width of the separate portions 16Aa and 16Ab is formed between the separate portions 16Aa and 16Ab. Like the first electrode brush 16A, part of the second electrode brush 16B is split into two separate portions 16Ba and 16Bb having substantially the same width as that of the separate portions 16Aa and 16Ab. A slit having a width wider than each width of the separate portions 16Ba and 16Bb is also formed between the separate portions 16Ba and 16Bb.

In addition, the rotor 22 includes rotor coils 22a and a rotor core 22b (see FIG. 1). The printed circuit board 23 is formed of, for example, a conductive foil on which a conductive layer pattern is formed, and includes a commutator section (hereinafter referred to as a commutator) and extending part 23b. As illustrated in FIG. 2, the commutator includes somewhat sector-shaped three contact electrode parts 23a (i.e, three segments) separated at an equally angled interval of about 120° with a small gap separating each contact electrode part 23 along the radial direction. The extending parts 23b extend radially from the contact electrode parts 23a in three directions. The extending parts 23b and also somewhat sector-shaped and are arranged around the commutator being separated at equally angled interval of a relatively smaller angle than the contact electrode parts 23a.

The case 11 has a cylinder-like shape and a somewhat oblong shaped transverse cross-sectional configuration. Further, the stator 12 is fixed on the inner circumference surface of the case 11. The stator 12 includes, for example, two cylindrical permanent magnets and is magnetized such that a predetermined number of magnetic poles (e.g., two magnetic poles in this embodiment) are formed on the circular circumference of the inner surface thereof.

In addition, the support base 13 closes the lower end of the cylinder case 11 to form a bottom surface. The upper bearing 14 closes the upper end of the cylinder case 11 and includes a through-hole in the center thereof so as to pass and rotatably hold the rotation shaft 21 therethrough. The lower bearing 15 is engaged and held in a concave portion formed in the center of the support base 13 and rotatably holds the lower end of the rotation shaft 21.

The electrode brushes 16 are fixed on the inside surface of the support base 13 at their fixing base end portions. The separate portions 16Aa and 16Ab and the separate portions 16Ba and 16Bb are brought into sliding contact with the contact electrode parts 23a with an appropriate contact pressure. Further, electric power is supplied to the rotor coils 22a of the rotor 22 from a drive power supply (not shown) through the first and second electrode brushes 16A and 16B.

The first and second electrode brushes 16A, 16B are brought into sliding contact with the contact electrode parts 23a an rotation angle positions different by 180°. Respective tip ends of extending portions of the first and second electrode brushes 16A and 16B protrude outward from the outside surface of the support base 13 to serve as external terminals 16c (illustrated in FIG. 1) for connection.

The rotation shaft 21 is rotatably held by the upper bearing 14 and the lower bearing 15 respectively arranged at the upper and lower ends of the case 11. The moving of the rotation shaft 21 in the thrust direction along the axis of the rotation shaft 21 is regulated within a predetermined range.

Further, in the rotor 22, the rotor coils 22a are wound around the rotor core 22b fixed on the rotation shaft 21.

The printed circuit board 23 formed in an almost circular disc shape or in a circular shape having flat surfaces 26A, 26B. The printed circuit board 23 fixes on the rotation shaft 21 such that the rotation shaft 21 perpendicularly intersects the printed circuit board 23 at the center portion thereof.

One surface 26B of the printed circuit board 23, as described above, includes the commutator with the contact electrode parts 23a and the extending parts 23b. The contact electrode parts 23a are led to a peripheral portion of the printed circuit board 23 through the extending parts 23b, and are connected to the rotor coils 22a.

The printed circuit board 23 may be formed using etch, evaporation, and printing techniques. For example, the printed circuit board 23 may be formed such that a conductive foil is formed on at least one surface of an insulation base board, and a necessary portion of the conductive foil is caused to remain and other portions are removed by an etch technique.

As stated above, the commutator includes the contact electrode parts 23a formed of the conductive foil on one surface 26B of the flat disc-shaped printed circuit board 23. The electrode brushes 16, which are previously fixed to the support base 13, press the surface 26B of the contact electrode parts 23a in the axial direction of the rotation shaft 21.

In assembling the DC motor, because the printed circuit board 23 and the support base 13 holding the electrode brushes 16 are merely assembled in order along the axial direction of the rotation shaft 21, there is no interference between the commutator and the electrode brushes 16 during assembly. Therefore, deformation of the electrode brushes 16 due to contact with the commutator during assembly does not occur. Consequently, the reliability of the motor operation is ensured.

Further, because the commutator is arranged on the flat printed circuit board 23, and the pair of electrode brushes 16A and 16B contacts the surface of the commutator in the same plane, the commutator and the support base 13 holding the electrode brushes 16 can be easily and smoothly assembled. Further, because it is easier to assemble the DC motor, mass-productivity of the DC motor is improved.

With the above-described construction, the number of construction parts and the number of manufacturing processes can be reduced. As a result, the cost of the DC motor can be lowered.

Moreover, because the commutator is formed on the flat printed circuit board 23, the axially extending space occupied by the commutator can be reduced when compared to the cylinder-shaped background commutator. Accordingly, the size of the DC motor in the axial direction of the rotation shaft 21 can be effectively reduced.

Further, as described above, the electrode brushes 16 are fixed on the inside surface of the support base 13. In addition, the external terminals 16c of the electrode brushes 16 are integrally mounted on the support base 13 such that the external terminals 16c protrude outward from the outside surface of the support base 13. Owing to the above-described simple and space saving construction of the DC motor, the cost and size of the DC motor is reduced.

Figure 3:
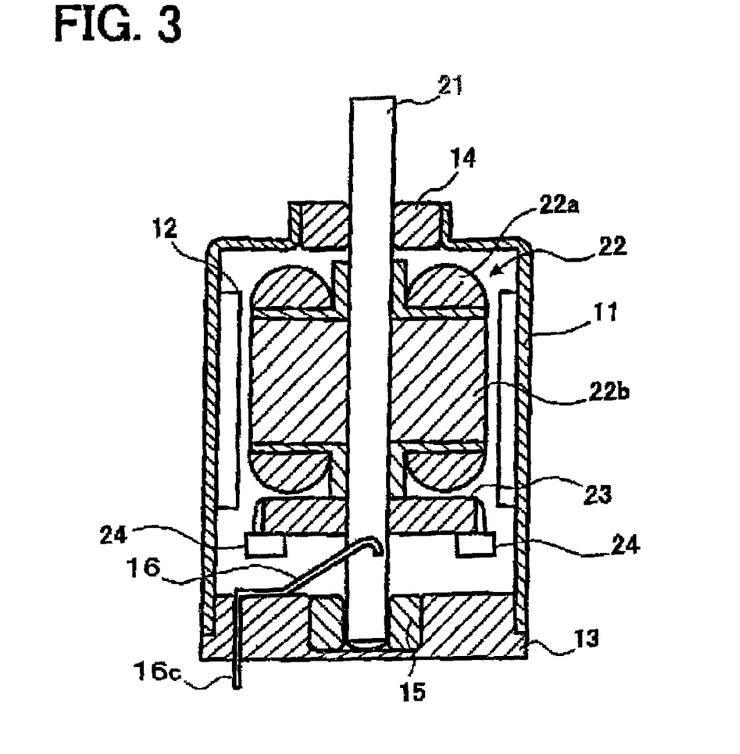
FIG. 3 is a vertical longitudinal sectional view of a DC motor according to a second embodiment of the present invention.
Figure 4:
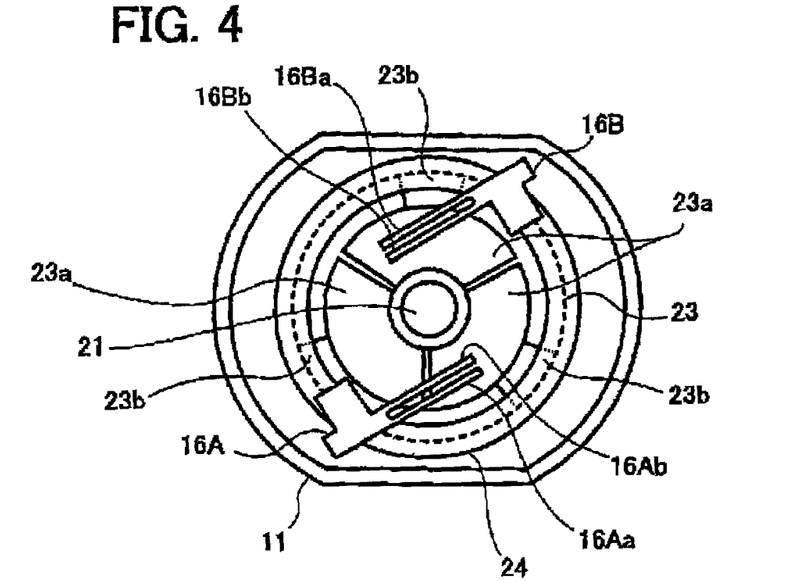
FIG. 4 is a transverse cross-sectional view of the DC motor of FIG. 3 and illustrates constructions of a commutator, electrode brushes, and a ring varistor.
Figure 5:
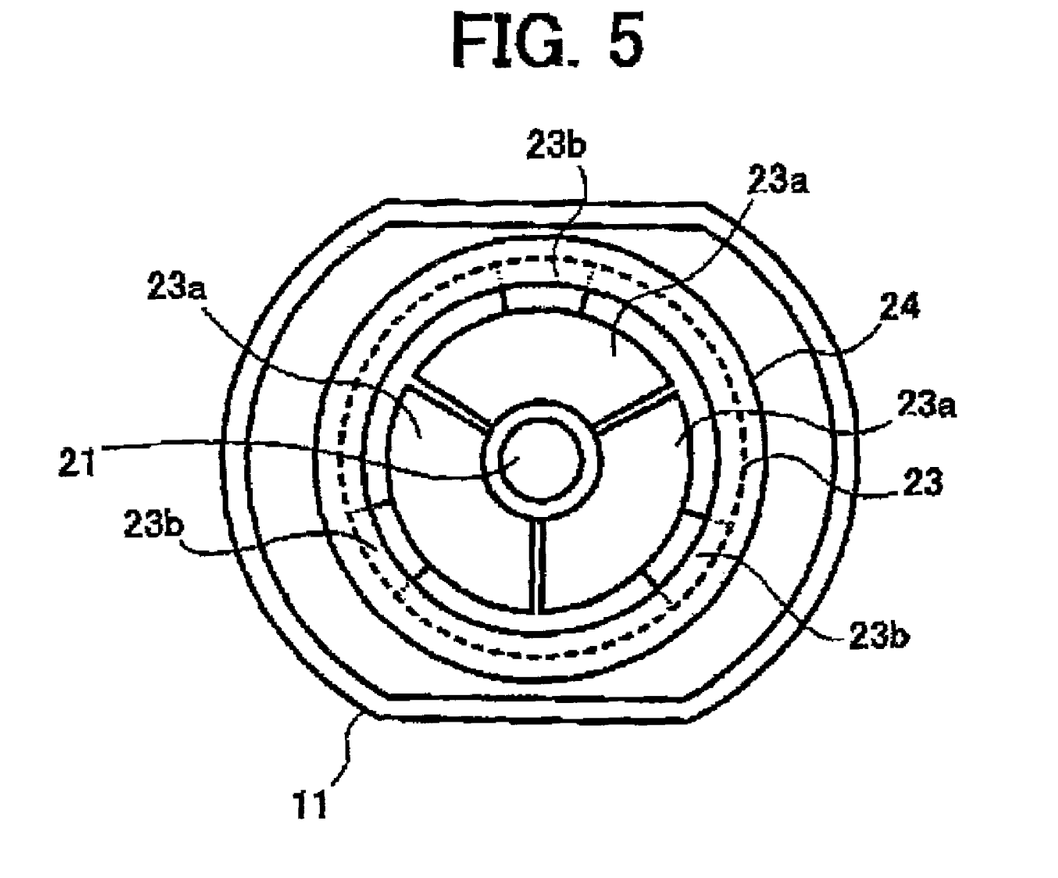
FIG. 5 is a transverse cross-sectional view of the DC motor of FIG. 3 and illustrates constructions of the commutator and the ring varistor.

Turning now to FIGS. 3 through 5, which illustrate a construction of a DC motor according to a second embodiment of the present invention. In more detail, FIG. 3 is a vertical longitudinal sectional view of the DC motor, and FIG. 4 is a transverse cross-sectional view of the DC motor of FIG. 3 and illustrates constructions of a commutator, electrode brushes, and a ring varistor. Further, FIG. 5 is a transverse cross-sectional view of the DC motor of FIG. 3 and illustrates constructions of the commutator and the ring varistor. The construction of the DC motor of the second embodiment is substantially the same as that of the DC motor of the first embodiment with the exception of a ring vanistor.

The DC motor illustrated in FIGS. 3 through 5 includes a ring varistor 24 to prevent and absorb noises produced in the DC motor, for example, at the electrode brushes 16. The ring varistor 24 is disposed coaxially on the outer periphery of the printed circuit board 23.

Because the ring varistor 24 is integrally fixed on the outer periphery of the printed circuit board 23, the noises produced in the DC motor can be effectively reduced in a compact configuration of the DC motor without decreasing the ease in assembling the DC motor. Further, space efficiency in the DC motor can be enhanced, and a manufacturing cost can be reduced.

Figure 6:
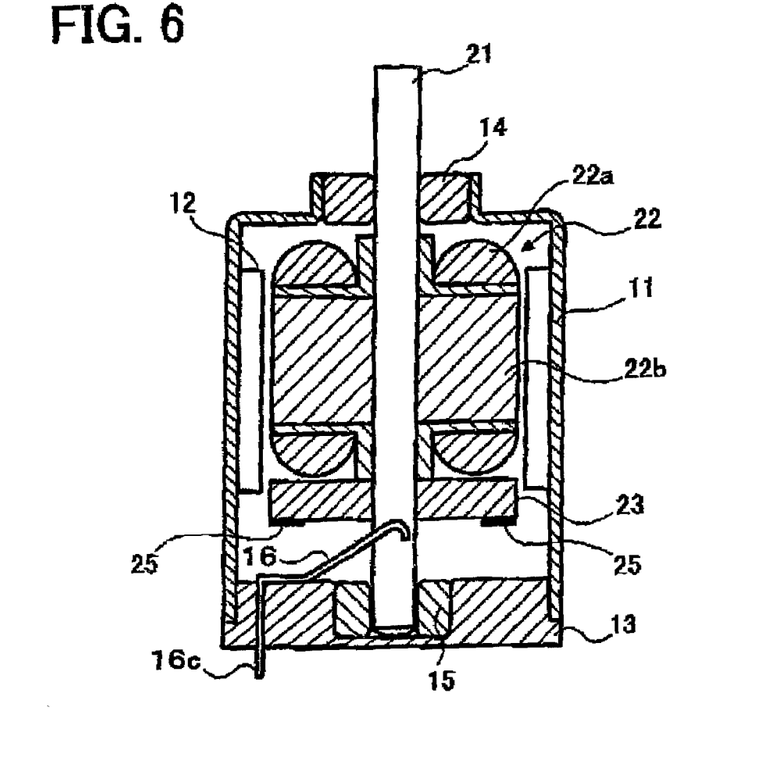
FIG. 6 is a vertical longitudinal sectional view of a DC motor according to a third embodiment of the present invention.
Figure 7:
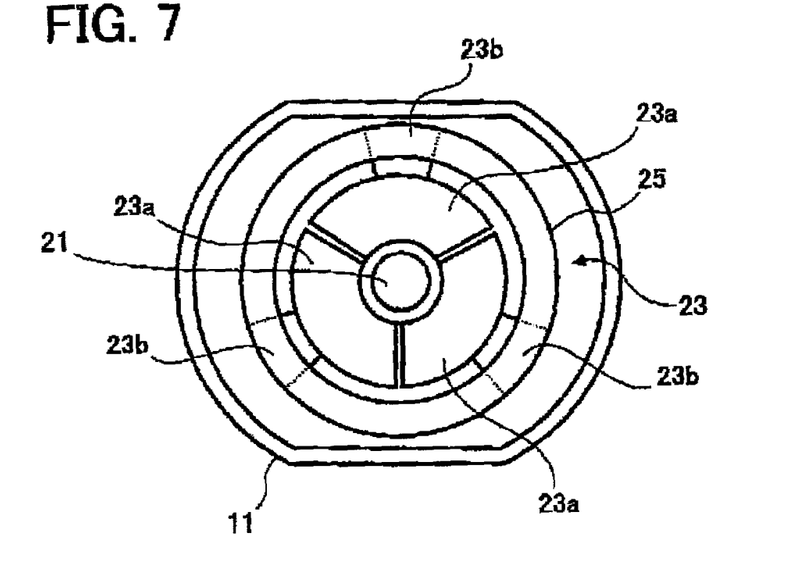
FIG. 7 is a transverse cross-sectional view of the DC motor of FIG. 6 and illustrates constructions of a commutator, and a printed resistance.

Turning now to FIGS. 6 and 7, which illustrate a construction of a DC motor according to a third embodiment of the present invention. In more detail, FIG. 6 is a vertical longitudinal sectional view of the DC motor, and FIG. 7 is a transverse cross-sectional view of the DC motor of FIG. 6 and illustrates constructions of a commutator and a printed resistance.

In the DC motor illustrated in FIGS. 6 and 7, as an alternative to the ring varistor 24 illustrated in FIGS. 3 through 5, a printed resistance 25 for removing noises is printed on the peripheral outer surface of the printed circuit board 23 in a ring state. Because of the printed resistance 25, the noises produced in the DC motor can be effectively reduced without decreasing the ease in assembling the DC motor. In addition, more space can be saved and a manufacturing cost can be further reduced when compared to the ring varistor 24.

Figure 8:
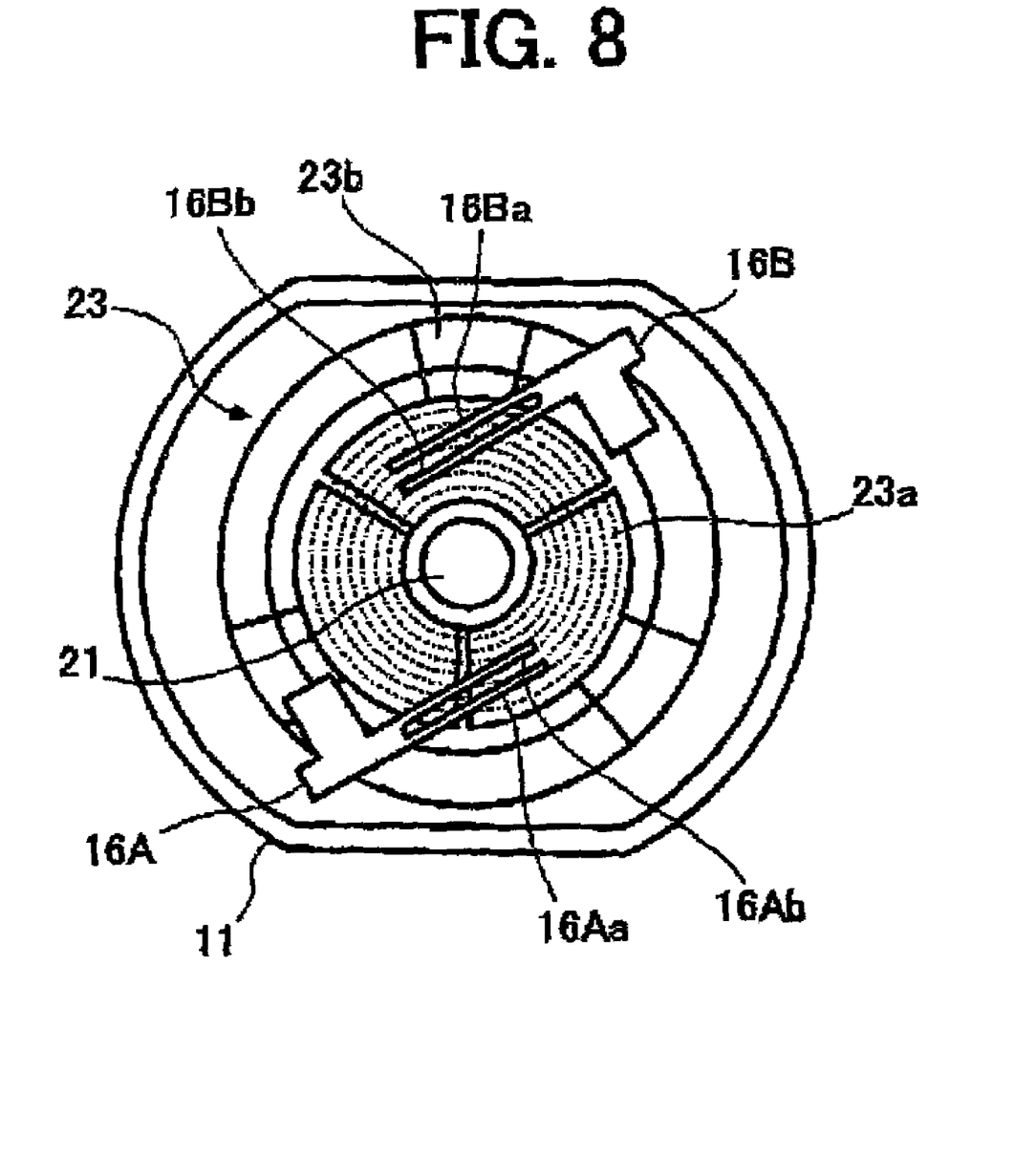
FIG. 8 is a transverse cross-sectional view of the DC motor of FIG. 1 and illustrates an alternative arrangement of the electrode brushes.

FIG. 8 is a transverse cross-sectional view of the DC motor of FIG. 1 and illustrates an alternative arrangement of the electrode brushes 16A and 16B relative to the commutator on the printed circuit board 23. The elements of the DC motor illustrated in FIG. 8 are the same as those of the DC motor illustrated in FIG. 2.

Referring to FIG. 8, each of the separate portions 16Aa and 16Ab of first electrode brush 16A is in sliding contact with the contact electrode parts 23a of the commutator at a position a predetermined distance from the axis of the rotation shaft 21 (i.e, at a predetermined radial position). The sliding contact positions of like separate portions 16Aa and 16Ab relative to the contact electrode parts 23a are apart from each other at the distance corresponding to the width of the slit of the first electrode brush 16A formed between the separate portions 16Aa and 16Ab.

Likewise, each of the separate portions 16Ba and 16Bb of the second electrode brush 16B is in sliding contact with the contact electrode parts 23a of the commutator at a position a predetermined distance from the axis of the rotation shaft 21 (i.e., at a predetermined radial position). The sliding contact positions of the separate portions 16Ba and 16Bb relative to the contact electrode parts 23a are also apart from each other at the distance corresponding to the width of the slit of the second electrode brush 16B formed between the separate portions 16Ba and 16Bb.

Further, the sliding contact positions of the separate portions 16Ba and 16Bb of the second electrode brush 16B are shifted by the distance corresponding to each width of the separate portions 16Ba and 16Bb relative to the sliding contact positions of the separate portions 16Aa and 16Ab of the first electrode brush 16A, respectively, in the radial direction Specifically, as shown with a one-dot-and-dash line in FIG. 8, the sliding contact positions of the separate portions 16Aa, 16Ab, 16Ab and 16Bb are arranged in the order of their decreasing radial distance from the axis of the rotation shaft 21. Thus, respective radial positions of the sliding contact positions of the separate portions 16Aa, 16Ba, 16Ab and 16Bb are shifted from each other.

With the above-described arrangement, the respective sliding contact positions of the separate portions 16Aa, 16Ab, 16Ba, and 16Bb do not overlap each other on the contact electrode parts 23a.

Because of the above-described alternative arrangement of the electrode brushes 16A and 16B illustrated in FIG. 8, wear of the contact electrode parts 23a can be substantially reduced, so that the durability of the contact electrode portions 23a can be improved.

The arrangement of the electrode brushes 16A and 16B is not limited to the arrangement illustrated in FIG. 8, and any other arrangements may be employed, so long as the respective sliding contact positions of the separate portions 16Aa, 16Ab, 16Ba, and 16Bb do not overlap each other on the contact electrode parts 23a. The alternative arrangement of the electrode brushes 16A and 16B may be also applied to the DC motors of the second and third embodiments.

Figure 9:
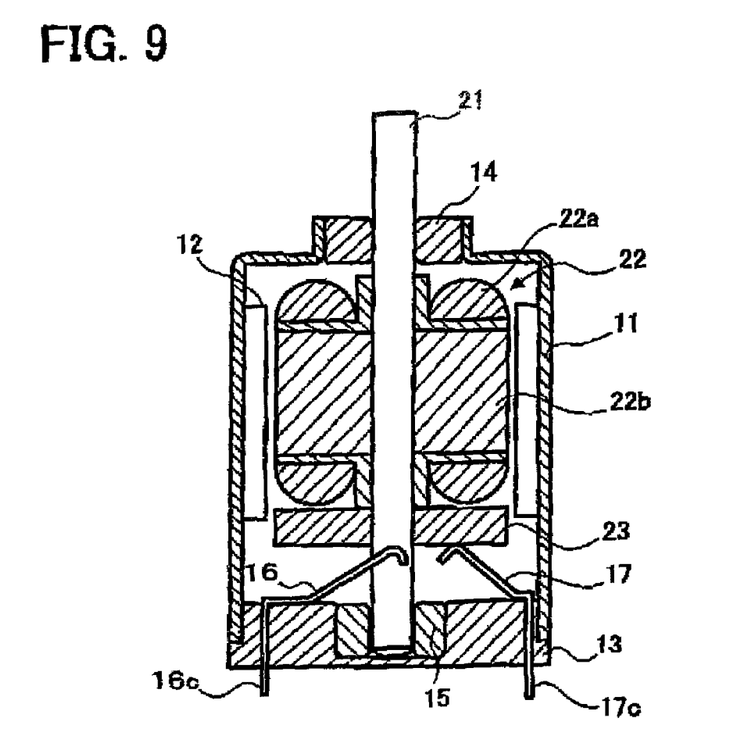
FIG. 9 is a vertical longitudinal sectional view of a DC motor according to a fourth embodiment of the present invention.
Figure 10:
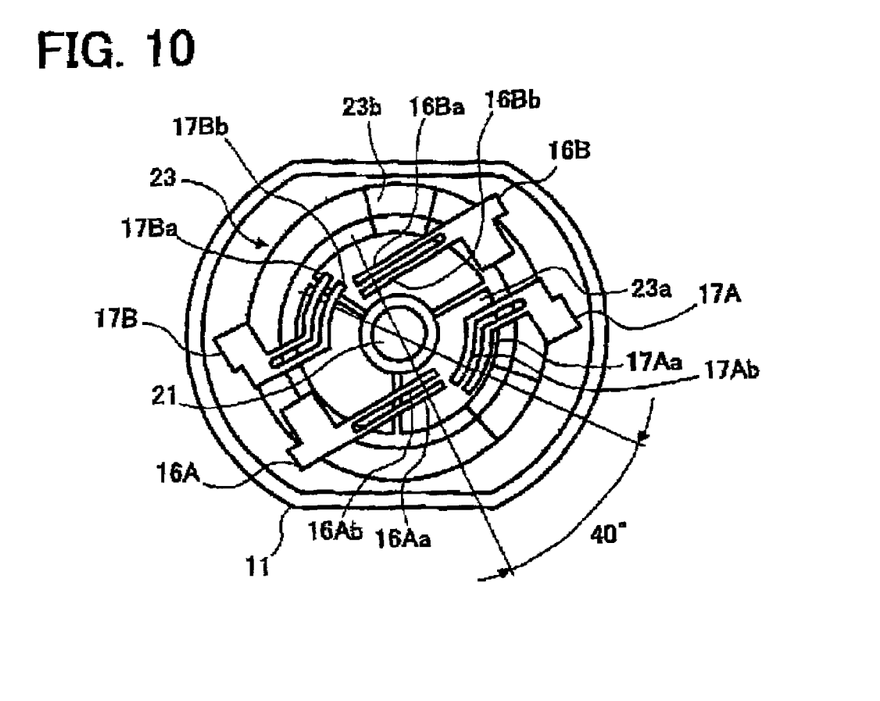
FIG. 10 is a transverse cross-sectional view of the DC motor of FIG. 9 and illustrates constructions of a commutator, electrode brushes, and rotation detecting brushes.

Turning now to FIGS. 9 and 10, which illustrate a construction of a DC motor according to a fourth embodiment of the present invention. In more detail, FIG. 9 is a vertical longitudinal sectional view of the DC motor, and FIG. 10 is a transverse cross-sectional view of the DC motor of FIG. 9 and illustrates constructions of a commutator, electrode brushes, and rotation detecting brushes. The construction of the DC motor of the fourth embodiment is substantially the same as that of the DC motor of the first embodiment illustrated in FIG. 1, except for rotation detecting brushes.

The DC motor illustrated in FIGS. 9 and 10 includes the case 11, the stator 12, the support base 13, the upper bearing 14, the lower bearing 15, the paired electrode brushes 16, paired rotation detecting brushes 17, the rotation shaft 21, the rotor 22, and the printed circuit board 23.

The pair of rotation detecting brushes 17 includes a first rotation detecting brush 17A and a second rotation detecting brush 17B (the first rotation detecting brush 17A and the second rotation detecting brash 17B may be collectively referred to the rotation detecting brushes 17). The first rotation detecting brush 17A and the second rotation detecting brush 17B are formed in a rotationally symmetrical state relative to the rotation shaft 21.

As illustrated in FIG. 10, the first rotation detecting brush 17A and the second rotation detecting brush 17B are arcuately outward curved. Part of the first rotation detecting brush 17A is split into two separate portions 17Aa and 17Ab, and a slit having a width wider than each width of the separate portions 17Aa and 17Ab is formed between the separate portions 17Aa and 17Ab. Like the first rotation detecting brush 17A, part of the second rotation detecting brush 17B is split into two separate portions l7Ba and 17Bb having substantially the same width as that of the separate portions 17Aa and 17Ab. Further, a slit having a width wider than each width of the separate portions 17Ba and 17Bb is also formed between the separate portions 17Ba and 17Bb.

The rotation detecting brushes 17 are fixed on the inside surface of the support base 13 at their fixing base end portions. The separate portions 17Aa and 17Ab of the rotation detecting brush 17A and the separate portions 17Ba and 17Bb of the rotation detecting brush 17B are brought into sliding contact with the contact electrode parts 23a of the commutator with an appropriate contact pressure to exact a voltage applied to the contact electrode parts 23a.

Further, the first rotation detecting brush 17A and the second rotation detecting brush 17B are brought into sliding contact with the contact electrode parts 23a on rotation angle positions different by 180°. In addition, the sliding contact positions of the first and second rotation detecting brushes 17A and 17B are shifted by a predetermined rotation angle less than 60° (e.g., 40° in this embodiment) relative to the sliding contact positions of the first and second electrode brushes 16A and 16B, respectively, Respective tip ends of extending portions of the first and second rotation detection brushes 17A and 17B protrude outward from the outside surface of the support base 13 to serve as external terminals 17c (illustrated in FIG. 9) for connection. The rotation detecting brushes 17 detect a signal on the contact electrode parts 23a of the commutator on the printed circuit board 23 indicative of an operation of the DC motor and output a signal via external terminals 17c.

In the DC motor of the fourth embodiment thus constructed, the commutator includes the contact electrode parts 23a formed of the conductive foil on one surface of the flat disc-shaped printed circuit board 23. The electrode brushes 16 and the rotation detecting brushes 17 which are previously fixed to the support base 13 press the surface of the contact electrode parts 23a in the axial direction of the rotation shaft 21.

Because the printed circuit board 23 and the support base 13 holding the electrode brushes 16 and the rotation detecting brushes 17 are merely assembled in order along the axial direction of the rotation shaft 21, there is no interference between the commutator and the brushes 16 and 17 during assembly. Therefore, deformation of the electrode brushes 16 and the rotation detecting brushes 17 due to contact with the commutator during assembly does not occur. Consequently, the reliability of the rotation detecting signal and the motor operation is ensured.

Further, because the commutator is arranged on the flat printed circuit board 23 and the brushes 16 and 17 contact the surface of the commutator in the same plane, the commutator and the support base 13 holding the electrode brushes 16 and the rotation detecting brushes 17 can be easily and smoothly assembled. In addition, because the ease in assembling the DC motor is increased, mass-productivity of the DC motor is improved.

Also in the DC motor of the fourth embodiment, rotational operation of the DC motor can be effectively detected by the rotation detecting brushes 17 with a simple and compact configuration.

Further, with the above-described construction, the number of construction parts and the number of manufacturing processes can be reduced. As a result, the cost of the DC motor can be lowered.

Moreover, because the commutator is formed on the flat printed circuit board 23, the axially external space occupied by the commutator can be reduced when compared to the cylinder-shaped background commutator. Accordingly, the size of the DC motor in the axial direction of the rotation shaft 21 can be effectively reduced.

Moreover, as described above, the electrode brushes 16 and the rotation detecting brushes 17 are fixed on the inside surface of the support base 13. Further, the external terminals 16c of the electrode brushes 16, and the external terminals 17c of the rotation detecting brushes 17 are integrally mounted on the support base 13 such that the external terminals 16c and 17c protrude outward the outside surface of the support base 13. Owing to the above-described simple and space saving construction of the DC motor, the cost and size of the DC motor is reduced.

Figure 11:
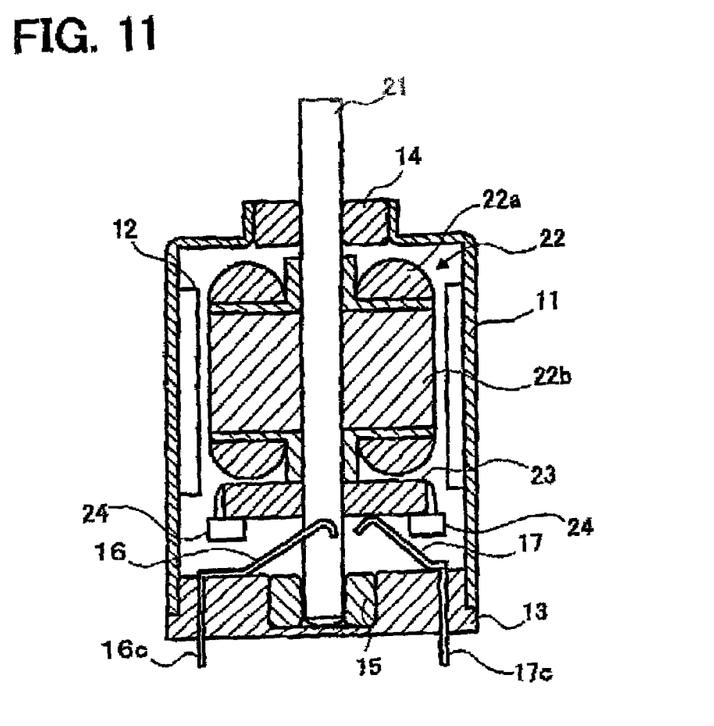
FIG. 11 is a vertical longitudinal sectional view of a DC motor according to a fifth embodiment of the present invention.
Figure 12:
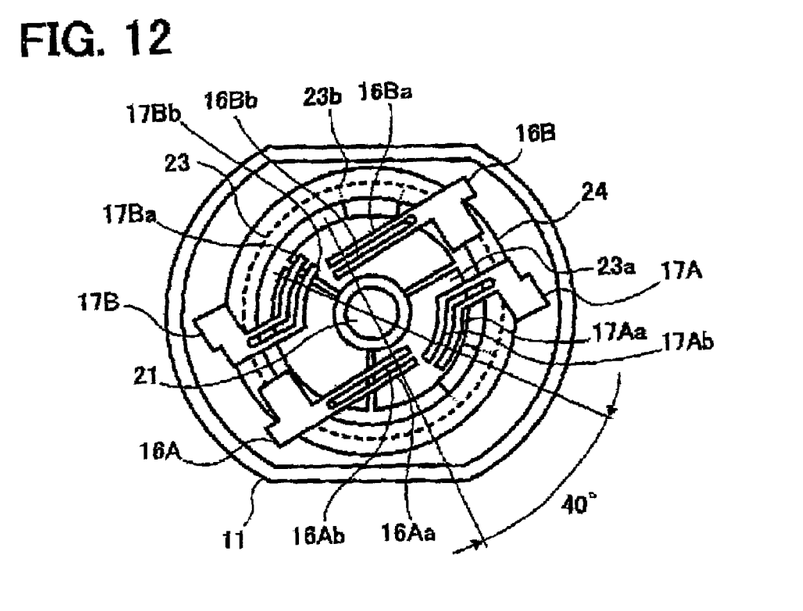
FIG. 12 is a transverse cross-sectional view of the DC motor of FIG. 11 and illustrates constructions of a commutator, electrode brushes, rotation detecting brushes, and a ring varistor.

Turning now to FIGS. 11 and 12, which illustrate a construction of a DC motor according to a fifth embodiment of the present invention. In more detail, FIG. 11 is a vertical longitudinal sectional view of the DC motor, and FIG. 12 is a transverse cross-sectional view of the DC motor of FIG. 11 and illustrates constructions of a commutator, electrode brushes, rotation detecting brushes, and a ring varistor. A transverse cross-sectional view of the DC motor of FIG. 11 illustrating constructions of the commutator and the ring varistor is common to FIG. 5.

The construction of the DC motor of the fifth embodiment is substantially the same as that of the DC motor of the fourth embodiment except for a ring varistor. Also, the construction of the DC motor of the fifth embodiment is substantially the same as that of the DC motor of the second embodiment except for rotation detecting brushes.

The DC motor illustrated in FIGS. 11 and 12 includes the ring varistor 24 to prevent and absorb noises produced in the DC motor, for example, at the electrode brushes 16 and the rotation detecting brushes 17. The ring varistor 24 is disposed coaxially on the outer periphery of the printed circuit board 23.

Similarly as in the DC motor of the second embodiment, because the ring varistor 24 is integrally fixed on the outer periphery of the printed circuit board 23, the noises produced in the DC motor can be effectively reduced in a compact configuration of the DC motor without decreasing the ease in assembling the DC motor. Further, space efficiency in the DC motor can be enhanced, and a manufacturing cost can be reduced.

Figure 13:
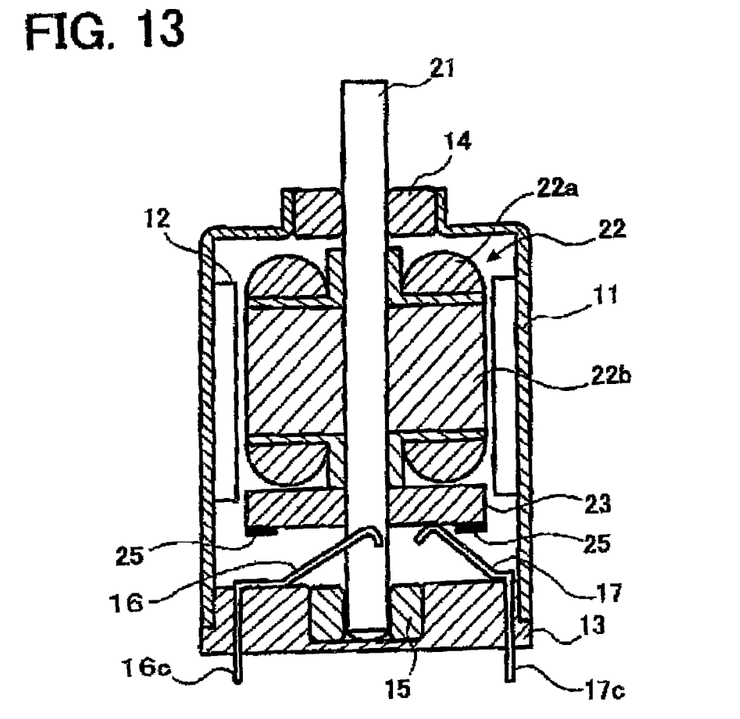
FIG. 13 is a vertical longitudinal sectional view of a DC motor according to a sixth embodiment of the present invention.

Turning now to FIG. 13, which illustrates a construction of a DC motor according to a sixth embodiment of the present invention. In more detail, FIG. 13 is a vertical longitudinal sectional view of the DC motor, and a transverse cross-sectional view of the DC motor of FIG. 13 illustrating constructions of a commutator and a printed resistance is common to FIG. 7. The construction of the DC motor of the sixth embodiment is substantially the same as that of external DC motor of the third embodiment with the exception of rotation detecting brushes.

In the DC motor illustrated in FIG. 13, as an alternative to the ring varistor 24 illustrated in FIGS. 11 and 12, the printed resistance 25 for removing noises is printed on the peripheral outer surface of the printed circuit board 23 in a ring state.

Similarly as in the DC motor of the third embodiment, owing to the printed resistance 25, the noises produced in the DC motor can be effectively reduced without decreasing the ease in assembling the DC motor. In addition, space can be saved and a manufacturing cost can be further reduced when compared to the ring varistor 24.

Figure 14:
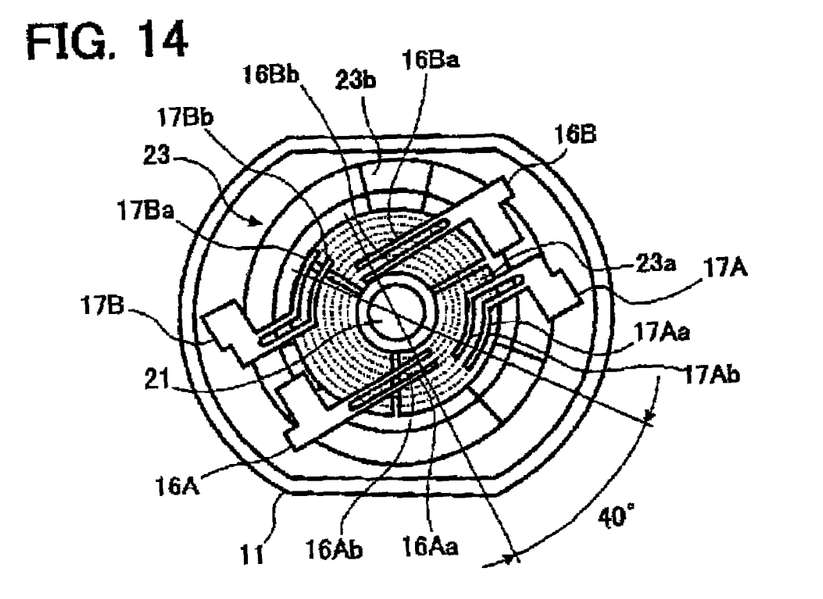
FIG. 14 is a transverse cross-sectional view of the DC motor of FIG. 9 and illustrates an alternative arrangement of the electrode brushes and the rotation detecting brushes.

Referring now to FIG. 14, which is a transverse cross-sectional view of the DC motor of FIG. 9, and which illustrates an alterative arrangement of the electrode brushes 16A and 16B and tine rotation detecting brushes 17A and 17B relative to the commutator on the printed circuit board 23. The elements of the DC motor illustrated in FIG. 14 are the same as those of the DC motor illustrated in FIG. 10.

As shown in FIG. 14, each of the separate portions 16Aa and 16Ab of the first electrode brush 16A is in sliding contact with the contact electrode parts 23a of the commutator at a position a predetermined distance from the axis of the rotation shaft 21 (i.e., at a predetermined radial position). The sliding contact positions of the separate portions 16Aa and 16Ab of the first electrode brush 16A relative to the contact electrode pads 23a are apart from each other at the distance corresponding to the width of the slit of the first electrode brush 16A formed between the separate portions 16Aa and 16Ab.

Likewise, each of the separate portions 16Ba and 16Bb of the second electrode brush 16B is in sliding contact with the contact electrode parts 23a of the commutator at a position a predetermined distance from the axis of the rotation shaft 21 (i.e., at a predetermined radial position). The sliding contact positions of the separate portions 16Ba and 16Bb of the second electrode brush 16B relative to the contact electrode parts 23a are also apart from each other at the distance corresponding to the width of the slit of the second electrode brush 16B formed between the separate portions 16Ba and 16Bb.

Further, the sliding contact positions of the separate portions 16Ba and 16Bb of the second electrode brush 16B are shifted by the distance corresponding to each width of the separate portions 16Ba and 16Bb relative to the sliding contact positions of the separate portions 16Aa and 16Ab of the first electrode brush 16A, respectively, in the radial direction. Specifically, as shown with a one-dot-and-dash-line in FIG. 14, the sliding contact positions of the separate portions 16Aa, 16Ba, 16Ab and 16Bb are arranged in the order of their decreasing radial distance from the axis of the rotation shaft 21.

On the other hand, each of the separate portions 17Aa and 17Ab of the first rotation detecting brush 17A is in sliding contact with the contact electrode parts 23a of the commutator at a position radially outward from the sliding contact position of the separate portion 16Aa of the first electrode brush 16A, which is located at the most distant position from the axis of the rotation shaft 21 of all the separate portions 16Aa, 16Ab, 16Ba, and 16Bb of the first and second electrode brushes 16A and 16B.

The sliding contact positions of the separate portions 17Aa and 17Ab of the first rotation detecting brush 17A relative to the contact electrode parts 23a are apart from each other at the distance corresponding to the width of the slit of the first rotation detecting brush 17A formed between the separate portions 17Aa and 17Ab.

Further, the sliding contact positions of the separate portions 17Ba and 17Bb of the second rotation detecting brush 17B are outward from the above-described sliding contact position of the separate portion 16Aa of the first electrode brush 16A, and are shifted by the distance corresponding to each width of the separate portions 17Ba and 17Bb relative to the sliding contact position of the separate portions 17Aa and 17Ab of the first rotation detecting brush 17A, respectively, in the radial direction.

Like the first rotation detecting brush 17A, the sliding contact positions of the separate portion 17Ba and 17Bb of the second rotation detecting brush 17B relative to the contact electrode parts 23a are apart from each other at the distance corresponding to the width of the slit of hie second rotation detecting brush 17:3 formed between the separate portions 17Ba and 17Bb.

Specifically, as shown with the one-dot-and-dash-line in FIG. 14, the sliding contact positions of the separate portions 17Ba, 17Aa, 17Bb, 17Ab, 16Aa, 16Ba, 16Ab, and 16Bb are arranged in the order of their decreasing radial distance from the axis of the rotation shaft 21. Thus, respective radial positions of the sliding contact positions of the separate portions 17Ba, 17Aa, 17Bb, 17Ab, 16Aa, 16Ba, 16Ab and 16Bb are shifted from each other.

With the above-described arrangement, the respective sliding contact positions of the separate portion 16Aa, 16Ab, 16Ba, 16Bb, 17Aa, 17Ab, 17Ba, and 17Bb do not overlap each other on the contact electrode parts 23a.

Owing to the above-described alternative arrangement of the electrode brushes 16A and 16B, and the rotation detecting brushes 17A and 17B illustrated in FIG. 14, wear of the contact electrode parts 23a can be substantially reduced so that the durability of the contact electrode portions 23a can be improved.

The arrangement of the electrode brushes 16A and 16B, and the rotation detecting brushes 17A and 17B is not limited to the arrangement illustrated in FIG. 14, and any other arrangements may be employed so long as the respective sliding contact positions of the separate portions 16Aa, 16Ab, 16Ba, 16Bb, 17Aa, 17Ab, 17Ba, and 17Bb do not overlap each other on file contact electrode parts 23a.

The above-described alternative arrangement of the electrode brushes 16A and 16B and the rotation detecting brushes 17A and 17B may be also applied to the DC motors of the fifth and sixth embodiments.

When electrode brushes and at least one rotation detecting brush are provided in a DC motor like the DC motors of the fourth through sixth embodiments, an appropriate connecting condition of the electrode brushes and the rotation detecting brush is required.

Figure 16:
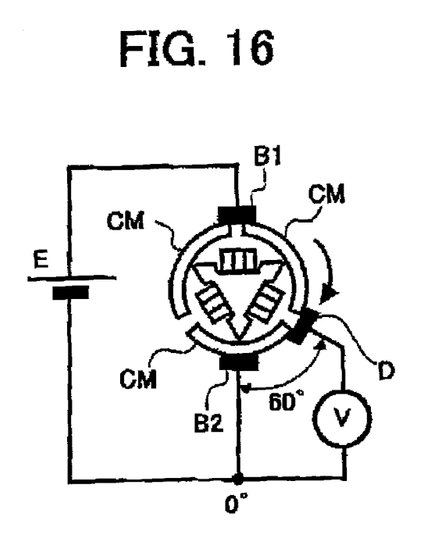
FIG. 16 is a schematic circuit diagram illustrating an example of a DC motor in which a rotation detecting brush is arranged in a position inclined by 60° relatively to an electrode brush.

Specifically, referring to FIG. 16, an electrode brush B1 contacts right and left upper conductive pieces of commutator CM, a rotation detecting brush D (only one rotation detecting brush is provided in this example) contacts the right upper and lower conductive pieces of the commutator CM, and an electrode brush B2 contacts the lower conductive piece of the commutator CM. Thereby, the electrode brush B1 connected to the positive (+) side of a power supply E is connected to the electrode brush B2, which is connected to the negative (−) side of the power supply E, through the right upper conductive piece of the commutator CM, the rotation detecting brush D, and the lower conductive piece of the commutator CM.

In the above-described connecting condition of the electrode brushes B1 and B2 and the rotation detecting brush D, both terminals of the power supply E can be short-circuited. Although no serious problem occurs when the DC motor rotates in a high speeds, a serious problem occurs when the DC motor stops rotating in the short-circuited state of the power supply E.

Generally, coils are wound around an iron core of a rotor of a DC motor. When current does not flow through the coils, the iron core of the rotor is attracted to a magnetic pole of a stator employing a permanent magnet. In a case of a three-pole DC motor, for example, stable points created by the attraction force exist on 6 positions per one rotation of the rotor. If the rotation detecting brush D is brought into contact with the commutator CM at a position different from the position corresponding to the above-described stable points, the above-described short-circuiting condition problem may be eliminated. However, basically, it is preferable to avoid the short-circuited state of the power supply E.

In order to avoid the short-circuited state of the power supply E, the angle formed between the rotation detecting brush D and one of the electrode brushes B1 and B2 located at near side of the rotation detecting bush D should be less than 60° in the case of three-pole DC motor. In the case of n-pole DC motor (n is a natural number of 3 or greater), the angle could be less than $(180/n)°$.

As a result, by setting the sliding contact position of the rotation detecting brush D with the commutator CM to the above-described rotation angle position, the reliability of the rotation detecting signal and the motor operation can be improved.

For the above-described reason, in the DC motors of the present invention, the sliding contact positions of the first and second rotation detecting brushes 17A and 17B are shifted by 40° relative to the sliding contact positions of the first and second electrode brushes 16A and 16B, respectively. Although the pair of rotation detecting brushes 17A and 17B is provided in the DC motors of the present invention, at least one rotation detecting brush may be provided.

Figure 15:
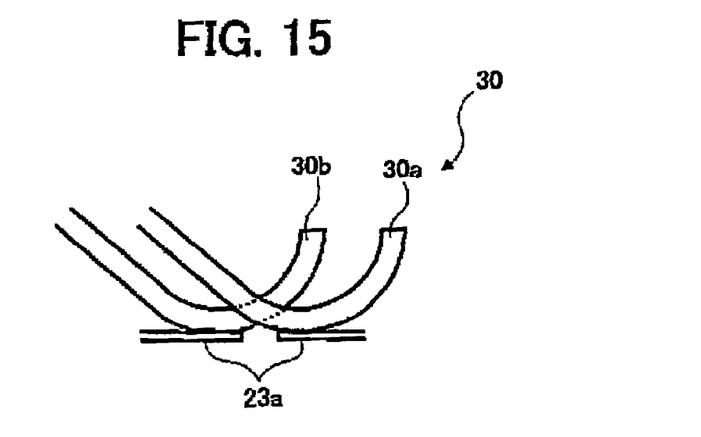
FIG. 15 is a schematic view of an alternative construction of the electrode brush.

Referring now to FIG. 15, which illustrates an electrode brush having an alternative construction. As an alternative to the separate portions 16Aa and 1 6Ab of the first electrode brush 16A and the separate portions 16Ba and 16Bb of the second electrode brush 16B, an electrode brush 30 includes separate portions 30a and 30b. As illustrated in FIG. 15, each rotation angle position of the sliding contact of the separate portions 30a and 30b is somewhat shifted relative to the contact electrode parts 23a.

When an electrode brush switches from one segment to another segment of contact electrode parts due to rotation of a commutator, the electrode brush may bound at a small gap formed between one segment and another segment of contact electrode parts especially in a high speed rotation of a DC motor. In such a case, the electrode brush is away from the contact electrode parts, thereby causing the DC motor to be in all unstable condition.

However, with the above-described construction of the electrode brush 30, at least one of the separate portions 30a and 30b contacts the contact electrode parts 23a when the electrode brush 30 passes over the gap formed between one segment and another segment of the contact electrode parts 23a. Thereby, the above-described unstable condition of the DC motor is obviated, so that the reliability of the DC motor is enhanced.

In the above-described DC motors of the present invention, the printed circuit board 23 is employed as an electrical parts mounting base board, and the commutator is formed of a plane conductive layer. By use of the printed circuit board 23, the cost of the DC motor can be reduced. However, other electrical parts mounting base board may be employed to achieve substantially the same effects as in the printed circuit board 23.

Further, the shapes of the electrode brushes 16 and e rotation detecting brushes 17 are not limited to those illustrated in the above-described embodiments, but any other shapes can be employed.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patents of the United States is:

1. A direct current motor, comprising:
   a rotor including a rotation shaft and rotor coils;
   a stator configured to apply a magnetic field to the rotor via magnetic poles of the stator opposing magnetic poles of the rotor;
   a flat disc-shaped electrical parts mounting base board fixed on the rotation shaft such that the rotation shaft perpendicularly intersects the electrical parts mounting base board and such that a first flat surface of the electrical parts mounting base board faces the rotor, the flat disc-shaped electrical parts mounting base board including a layer of a conductive material into which a plane conductive pattern is formed and including a commutator section including a contact electrode part formed with the plane conductive layer pattern and connected to the rotor coils, the contact electrode part and the plane conductive layer pattern being directly formed on a second flat surface of the electrical parts mounting base board;
   a pair of electrode brushes in sliding contact with the contact electrode part of the commutator section and configured to supply electric power to the rotor coils through the commutator section;
   a support base configured to support the rotation shaft of the rotor;
      wherein the electrode brushes include respective external terminals configured to provide an external connection to the direct current motor, and
      wherein the electrode brushes and the external terminals of the electrode brushes are fixed on the support base and the external terminals of the electrode buses protrude outward from an outside surface of the support base; and
   further comprising at least one rotation detecting brush being arcuately curved outward from the rotation shaft and in sliding contact with the contact electrode part of the commutator section and configured to detect a signal on the commutator section indicative of an operation of the direct current motor.

2. The direct current motor according to claim 1,
   wherein the at least one rotation detecting brush includes a respective external terminal configured to provide an external connection to the direct current motor, and
   wherein the respective external terminal of the at least one rotation detecting brush is fixed on the support base and also protrudes outward from the outside surface of the support base.

3. The direct current motor according to claim 1, wherein the electrode brushes are configured to contact the commutator section at representative first and second rotation angle positions 180° apart on the commutator section, and wherein the at least one rotation detecting brush is configured to contact the commutator section at a third rotation angle position such that an angle formed between the at least one rotation detecting brush and one of the electrode brushes is less than 180°/n, where n is the number of rotor magnetic poles and n is a natural number of 3 or greater.

4. The direct current motor according to claim 1, further comprising:
   a noise suppressing element provided on the electrical parts mounting base board and configured to suppress noise produced in the direct current motor.

5. The direct current motor according to claim 1, wherein respective electrode brushes are split into plural separate portions, and wherein sliding contacts of the separate portions with the contact electrode part of the commutator section cause a phase difference due to a shift of rotation angle positions of the sliding contacts of the separate portions relative to the contact electrode part.

6. A direct current motors, comprising:
   a rotor including a rotation shaft and rotor coils;
   means for applying a magnetic field to the rotor;
   a flat disc-shaped electrical parts mounting base board fixed on the rotation shaft such that the rotation shaft perpendicularly intersects to the electrical parts mounting base board and such that a first flat surface of the electrical parts mounting base board faces the rotor, the flat disc-shaped electrical parts mounting base board including a layer of a conductive material into which a plane conductive pattern is formed and including a commutator section including a contact electrode part formed with the plane conductive layer pattern and connected to the rotor coils, the contact electrode part and the plane conductive layer pattern being directly formed on a second flat surface of the electrical parts mounting base board;

means for supplying electric power to the rotor coils through the commutator section, the supplying means being in sliding contact with the contact electrode part of the commutator section;

means for supporting the rotation shaft of the rotor;

a first means for connecting externally to the supplying means;

wherein the supplying means and the first connecting means are fixed on the supporting means, and the first connecting means externally protrudes outward from an outside surface of the supporting means; and further comprising means for detecting a signal on the commutator section indicative of an operation of the direct current motor, the detecting means being arcuately curved outward from the rotation shaft and being in sliding contact with the contact electrode part of the commutator section.

7. The direct current motor according to claim 6, further comprising:

a second means for connecting externally to the detecting means, wherein the second connecting means are fixed on the supporting means, and the second connecting means also protrudes outward from the outside surface of the supporting means.

8. The direct current motor according to claim 6, further comprising:

means for suppressing noise produced in the direct current motor, wherein the suppressing means is provided on the electrical parts mounting base board.

9. An apparatus having a direct current motor, comprising:

a rotor including a rotation shaft and rotor coils;

a stator configured to apply a magnetic field to the rotor via magnetic poles of the stator opposing magnetic poles of the rotor;

a flat-disc-shaped electrical parts mounting base board fixed on the rotation shaft such that the rotation shaft perpendicularly intersects the electrical parts mounting base board and such that a first flat surface of the electrical parts mounting base board faces the rotor, the flat disc-shaped electrical parts mounting base board including a layer of a conductive material into which a plane conductive pattern is formed and including a commutator section including a contact electrode part formed with the plane conductive layer pattern and connected to the rotor coils, the contact electrode part and the plane conductive layer pattern being directly formed on a second flat surface of the electrical parts mounting base board;

a pair of electrode brushes in sliding contact with the contact electrode part of the commutator section and configured to supply electric power to the rotor coils through the commutator section;

a support base configured to support the rotation shaft of the rotor;

wherein the electrode brushes include respective external terminals configured to provide an external connection to the direct current motor, and wherein the electrode brushes and the external terminals of the electrode brushes are fixed on the support base and the external terminals of the electrode buses protrude outward from an outside surface of the support base; and further comprising at least one rotation detecting brush being accurately curved outward from the rotation shaft and in sliding contact with the contact electrode part of the commutator section and configured to detect a signal on the commutator indicative of an operation of the direct current motor.

10. An apparatus having a direct current motor, comprising:

a rotor including a rotation shaft and rotor coils;

a stator configured to apply a magnetic field to the rotor via magnetic poles of the stator opposing magnetic poles of the rotor;

an electrical parts mounting base board fixed on the rotation shaft such that the rotation shaft perpendicularly intersects the electrical parts mounting base board, the electrical parts mounting base board including a layer of a conductive material into which a plane conductive pattern is formed and including a commutator section including a contact electrode part formed with the plane conductive layer pattern and connected to the rotor coils, the contact electrode part and the plane conductive layer pattern being directly formed on the electrical parts mounting base board;

a pair of electrode brushes, each pair of electrode brushes including first and second separate portions that are in sliding contact with the contact electrode part of the commutator section at respective sliding contact positions of a different distance from an axis of the rotation shaft, and configured to supply electric power to the rotor coils through the commutator section;

a support base configured to support the rotation shaft of the rotor;

wherein the electrode brushes include respective external terminals configured to provide an external connection to the direct current motor, wherein the electrode brushes and the external terminals of the electrode brushes are fixed on the support base and the external terminals of the electrode buses protrude outward from an outside surface of the support base, and wherein the respective sliding contact positions of the electrode brushes with the contact electrode part are shifted in the radial direction; and further comprising at least one rotation detecting brush being arcuately curved outward from the rotation shaft and in sliding contact with the contact electrode part of the commutator section at at least one sliding contact position and configured to detect a signal on the commutator section indicative of an operation of the direct current motor, wherein the respective sliding contact positions of the electrode brushes and the at least one sliding contact position of the at least one rotation detecting brush are arranged at a different distance from the axis of the rotation shaft, and are shifted from each other in the radial direction.

* * * * *